(12) United States Patent
Roche et al.

(10) Patent No.: US 8,356,769 B2
(45) Date of Patent: Jan. 22, 2013

(54) AIRCRAFT ENGINE ASSEMBLY COMPRISING A FAN COWL-SUPPORTING CRADLE MOUNTED ON TWO SEPARATE ELEMENTS

(75) Inventors: Frederic Roche, Blagnac (FR); Jean-Marc Martinou, L'Union (FR)

(73) Assignee: Airbus Operations SAS, Toulouse (FR)

( * ) Notice: Subject to any disclaimer, the term of this patent is extended or adjusted under 35 U.S.C. 154(b) by 935 days.

(21) Appl. No.: 12/307,136

(22) PCT Filed: Jul. 10, 2007

(86) PCT No.: PCT/EP2007/057018
§ 371 (c)(1),
(2), (4) Date: Dec. 31, 2008

(87) PCT Pub. No.: WO2008/006823
PCT Pub. Date: Jan. 17, 2008

(65) Prior Publication Data
US 2009/0266932 A1     Oct. 29, 2009

(30) Foreign Application Priority Data
Jul. 11, 2006   (FR) ...................................... 06 52910

(51) Int. Cl.
*B64D 27/00* (2006.01)
(52) U.S. Cl. .......................................... 244/54; 248/557
(58) Field of Classification Search ................. 244/53 R, 244/54; 60/796, 797; 248/554
See application file for complete search history.

(56) References Cited

U.S. PATENT DOCUMENTS

| | | | | |
|---|---|---|---|---|
| 4,044,973 A * | 8/1977 | Moorehead | ................. | 244/54 |
| 4,458,863 A * | 7/1984 | Smith | .............. | 244/54 |
| 4,471,609 A * | 9/1984 | Porter et al. | .................... | 60/797 |
| 4,697,763 A * | 10/1987 | Vermilye | .................. | 244/129.4 |
| 4,917,331 A * | 4/1990 | Hager et al. | ..................... | 244/54 |
| 5,054,715 A * | 10/1991 | Hager et al. | ..................... | 244/54 |
| 5,157,915 A * | 10/1992 | Bart | ............................. | 60/797 |
| 5,372,338 A * | 12/1994 | Carlin et al. | ................... | 244/54 |
| 6,126,110 A * | 10/2000 | Seaquist et al. | ................ | 244/54 |
| 6,131,850 A | 10/2000 | Hey et al. | | |
| 6,227,485 B1 * | 5/2001 | Porte | ............................. | 244/54 |
| 6,244,539 B1 * | 6/2001 | Liston et al. | ................... | 244/54 |
| 7,255,307 B2 * | 8/2007 | Mayes | ....................... | 244/129.5 |
| RE39,972 E * | 1/2008 | Royalty | ........................ | 244/54 |
| 7,398,945 B2 * | 7/2008 | Huggins et al. | ................ | 244/54 |
| 2004/0227033 A1 * | 11/2004 | Picard et al. | .................... | 244/54 |
| 2008/0073460 A1 * | 3/2008 | Beardsley et al. | ............. | 244/54 |

FOREIGN PATENT DOCUMENTS

EP          0 453 360          10/1991

OTHER PUBLICATIONS

U.S. Appl. No. 12/307,142, filed Dec. 31, 2008, Roche.

* cited by examiner

*Primary Examiner* — Christopher P Ellis
(74) *Attorney, Agent, or Firm* — Oblon, Spivak, McClelland, Maier & Neustadt, L.L.P.

(57) ABSTRACT

An aircraft engine assembly including an engine, an engine mounting structure, and a nacelle surrounding the engine and including fan cowls. The mounting structure includes a rigid structure and a forward aerodynamic structure on which the fan cowls are hinged, the forward aerodynamic structure including a cradle provided with an aft mounting mechanism mounted on the rigid structure. The cradle also includes a forward mounting mechanism mounted on a fan case of the engine.

11 Claims, 4 Drawing Sheets

AIRCRAFT ENGINE ASSEMBLY COMPRISING A FAN COWL-SUPPORTING CRADLE MOUNTED ON TWO SEPARATE ELEMENTS

TECHNICAL AREA

The present invention generally relates to an aircraft engine assembly comprising an engine, an engine mount and a nacelle surrounding the engine and provided with fan cowls, the above-mentioned mount comprising a rigid structure and a forward aerodynamic structure on which the fan cowls are movably mounted.

This type of device also called a mounting pylon or <<EMS>> for Engine Mounting Structure globally allows an engine such as a gas turbine engine to be mounted below the wing of an aircraft, or allows the mounting of this engine above the wing or even onto an aft portion of the fuselage of the aircraft.

STATE OF THE PRIOR ART

Said mounting structure is effectively provided so as to form a connecting interface between an engine and an aircraft wing. It enables the loads generated by the associated engine to be transmitted to the frame of this aircraft, and also provides a pathway for fuel, electric, hydraulic and air supply lines between the engine and the aircraft.

To ensure load transmission, the mounting structure comprises a rigid structure also called a primary structure often of <<box>> type i.e. formed by the assembly of upper and lower spars and of side panels joined together via transverse ribs.

Also, the mounting structure is provided with mounting means positioned between the engine and the rigid structure, these means globally comprising two engine attachments, and a thrust load device to transmit thrust generated by the engine. In the prior art, this thrust load device usually comprises two side thrust links connected firstly to an engine casing such as the fan case or the intermediate casing, and secondly to an aft engine attachment secured to the central casing or to its exhaust casing.

Similarly, the mounting structure also comprises another series of attachments forming an assembly system positioned between the rigid structure and the aircraft wing, this system usually consisting of two or three attachments.

Also, the pylon is provided with a plurality of secondary structures which in particular ensure the separating and supporting of supply systems and at the same time carry parts forming the aerodynamic cowling, these parts generally being in the form of panels or cowling integrated in these same structures. In manner known to those skilled in the art, the secondary structures differ from the rigid structure, also called the primary structure, in that they are not intended to transmit loads generated by the engine which are to be transmitted towards the aircraft wing.

Amongst the secondary structures, there is a forward aerodynamic structure positioned forward of the rigid structure of the mounting pylon, this forward aerodynamic structure not only having an aerodynamic cowling function but also allowing the installation, separation and conveying of different supply systems (air, electric, hydraulic, fuel). Also, this forward aerodynamic structure carries the fan cowls of the associated engine, whilst the thrust reverser cowls are generally carried by the rigid structure of the mounting pylon.

In prior art solutions, the forward aerodynamic structure generally includes a cradle surrounded by aerodynamic cowling, fixedly mounted on the cradle. The aerodynamic cowling, also called aerodynamic cowl panel or element, therefore covers the cradle, the cradle acting as structural support for the fan cowls.

The above-mentioned cradle is usually mounted on the rigid structure by means of suitable mounting means. However, if the engine assembly is subjected to major stresses such as those encountered during take-off and landing phases, or when flying in strong turbulence, the securing of the cradle of the forward aerodynamic structure to the rigid structure leads to a substantial modification of the global geometry of the assembly, and more specifically of the nacelle. In particular, misalignment accompanying engine deformation may be observed between the air intake of the nacelle and the fan cowls mounted on said forward aerodynamic structure secured to the rigid structure of the mounting pylon, this forward aerodynamic structure therefore possibly also being drawn away from the same nacelle air intake.

The phenomenon observed evidently causes drag, which is detrimental to the overall performance level of the aircraft.

Additionally, it is indicated that a similar phenomenon is also encountered when the cradle fixedly carrying the aerodynamic cowling is no longer mounted on the rigid structure of the mounting pylon but solely on the fan case of the engine, joined to the nacelle air intake. In said case, it may be observed that the aerodynamic cowling of the cradle joined to the fan case no longer lies flush with the other aerodynamic cowling of the mounting pylon and notably with the fairing called the fillet fairing.

OBJECT OF THE INVENTION

The objective of the invention is therefore to propose an aircraft engine assembly which overcomes the above-mentioned drawbacks related to prior art embodiments.

For this purpose, the subject-matter of the invention is an aircraft engine assembly comprising an engine, an engine mounting structure and a nacelle surrounding the engine and provided with fan cowls, this mounting structure comprising a rigid structure and a forward aerodynamic structure, this latter structure having a cradle on which the fan cowls are movably mounted and being surrounded by aerodynamic cowling, the cradle of the forward aerodynamic structure being equipped with aft mounting means mounted on the rigid structure of the mounting structure. According to the invention, the cradle of the forward aerodynamic structure is additionally equipped with forward mounting means mounted on a fan case of the engine.

Therefore, with the proposed arrangement it is possible largely to limit the harmful effects of misalignment described above, since the forward part of the cradle of the forward aerodynamic structure carrying the fan cowls is henceforth capable of better accompanying deformation of the engine when strong demand is placed on the assembly. Therefore the flush junction between the nacelle air intake and the fan cowls can be maintained, which allows limitation of drag losses encountered with prior art embodiments. In this respect, the drag losses are also reduced by maintaining the flush junction between the aerodynamic cowling and the other aerodynamic fairing of the mounting pylon, through the presence of the aft mounting means, and these drag losses are similarly reduced by maintaining the flush junction between the aerodynamic fairing and the air intake, through the presence of the forward mounting means.

Additionally, with this particular arrangement it is advantageously possible to limit the forward cantilever previously encountered with the structural cradle carrying the fan cowls, since this cradle is now equipped with forward mounting means mounted on the fan case of the engine.

Preferably, the forward mounting means are in the form of a forward attachment designed to transmit loads exerted in a longitudinal direction of the engine, in a transverse direction of this same engine and also in a vertical direction of this engine.

Also, the aft mounting means preferably comprise two aft semi-attachments arranged either side of a forward portion of the rigid structure of the mounting structure, each of the two aft semi-attachments being designed to transmit loads exerted in a transverse direction of the engine and in a vertical direction of the engine, allowing limited relative movement for each one in a longitudinal direction of the engine, between an aft part of the cradle of the forward aerodynamic structure and a forward portion of the rigid structure.

In other words, each of the two aft semi-attachments transmits the loads exerted in the transverse and vertical directions, but not those exerted in the longitudinal direction in which the slight relative displacements between the aft portion of the forward aerodynamic structure and the forward portion of the rigid structure can therefore be absorbed.

Therefore the combination of the forward attachment and of the two aft semi-attachments, forming the mounting means for the forward aerodynamic structure, allows mounting means to be obtained which are advantageously strongly close to an isostatic mounting system.

By way of indication it is noted that, in the above description, mention is made of the transmitting of loads exerted in the transverse and vertical directions of the engine by the different attachments. This particularly applies when the engine is intended to be mounted above the aircraft wing or below the aircraft wing, and optionally also in the event of engine mounting on an aft portion of the aircraft fuselage. Nonetheless in this latter case, it is possible that the loads transmitted by the attachments are no longer directed transversely and vertically relative to the engine as mentioned above, but are respectively oriented in a first direction of the engine orthogonal to the longitudinal direction, and in a second direction of the engine orthogonal to the first direction and to the longitudinal direction, each of these first and second directions then lying at an angle to the vertical and transverse directions of the engine. Evidently, the above-mentioned angle of the first and second directions of the engine depends on the geometry followed for the engine assembly, and on its positioning relative to the aft portion of the fuselage, as is well known to persons skilled in the art.

Preferably the two aft semi-attachments are arranged symmetrically relative to a median plane of the assembly, passing through a longitudinal axis of the engine. Here again it is to be noted that the second direction defining this plane is given in relation to the configuration used. By way of example if the engine is intended to be mounted above or below the aircraft wing, the second direction is generally the vertical direction of the engine.

In this engine assembly in which the nacelle conventionally comprises an air intake lying flush with the fan cowls, and positioned forwardly relative to these cowls, provision is preferably made for the aerodynamic cowling to be fixedly mounted on the cradle carrying the above-mentioned forward and aft mounting means. The aerodynamic cowling, preferably solely attached to its cradle, therefore covers this cradle which acts as structural support for the fan cowls, since the assembly also preferably comprises a plurality of fan cowl hinge fittings of which at least some are secured to this same cradle.

Again preferably provision is made for a forward portion of the rigid structure of the mounting structure to pass through an aft part of the cradle.

Also, the mounting structure preferably comprises a plurality of engine attachments including a forward engine attachment attached firstly to the rigid structure and secondly to the fan case of the engine. In this case provision is preferably made so that the forward engine attachment is positioned in a longitudinal direction of the engine between the forward and aft mounting means of the cradle of the forward aerodynamic structure.

Finally a further subject of the invention is an aircraft comprising at least one engine assembly such as described above, assembled onto a wing or an aft portion of the fuselage of this aircraft.

Other advantages and characteristics of the invention will become apparent in the detailed non-limiting description given below.

BRIEF DESCRIPTION OF THE DRAWINGS

This description is made with reference to the appended drawings amongst which.

DETAILED DESCRIPTION OF PREFERRED EMBODIMENTS

Figure 1:
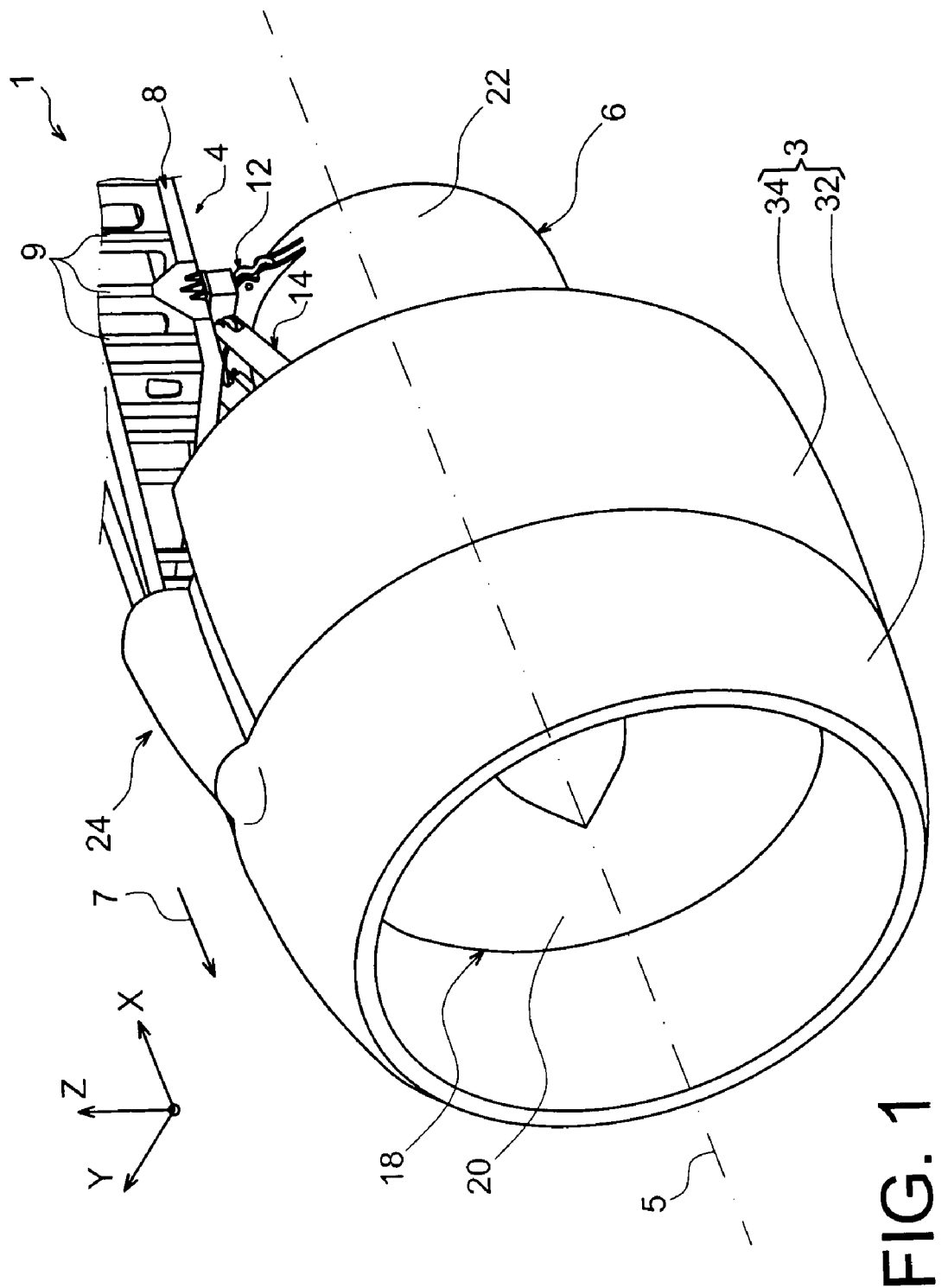
FIG. 1 is a partial perspective view of an aircraft engine assembly according to one preferred embodiment of the present invention.
Figure 2:
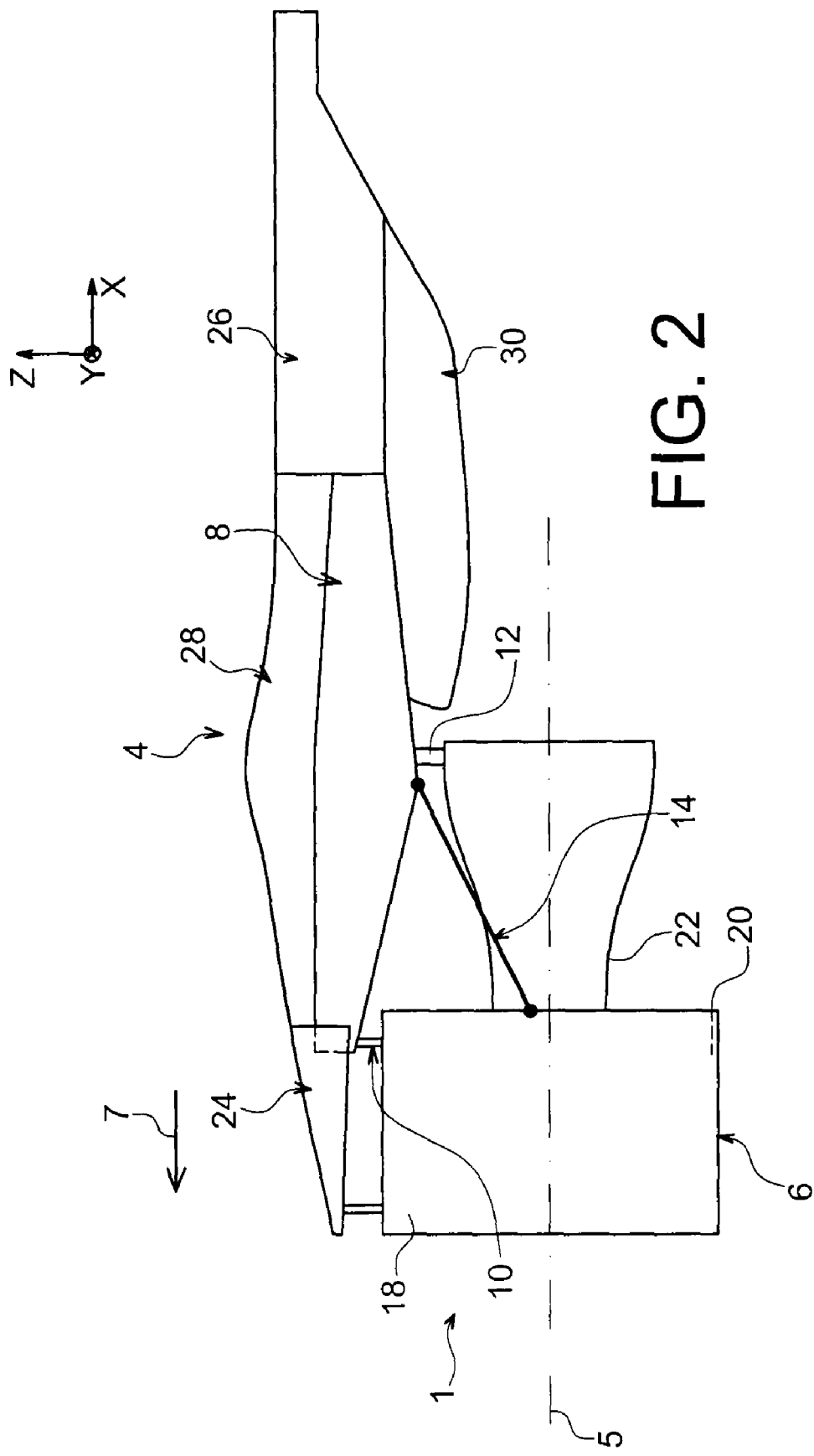
FIG. 2 is a partial, diagrammatic side view of the engine assembly illustrated FIG. 1.

With reference firstly to FIGS. 1 and 2, an aircraft engine assembly 1 can be seen intended to be attached below a wing of this aircraft (not shown), this assembly 1 comprising a mounting structure 4, an engine 6 such as a turbojet engine mounted below this structure 4, and a nacelle 3 of which only the forward portion is shown FIG. 1.

In the remainder of this description X is used to designate the longitudinal direction of the structure 4 which is comparable to the longitudinal direction of the turbojet engine 6, this direction X lying parallel to a longitudinal axis 5 of this turbojet engine 6. Y is used to designate the direction oriented substantially transversally relative to the structure 4 and also comparable to the transverse direction of the turbojet engine 6, and Z designates the vertical direction or height, these three directions X, Y and Z lying orthogonal to one another.

Also, the terms <<forward>> and <<aft>> are to be considered relative to the direction of travel of the aircraft subsequent to the thrust exerted by the turbojet engine 6, this direction being schematically illustrated by arrow 7.

Globally the mounting structure 4 comprises a rigid structure 8 also called primary structure, carrying mounting means for the engine 6, these mounting means having a plurality of engine attachments 10, 12 and a thrust load device 14 to transmit thrust loads generated by the engine 6.

By way of indication, it is noted that the mounting structure 4 comprises another series of attachments (not shown) joined to the rigid structure 8 and used to mount this assembly 1 below the wing of the aircraft.

Also, the mounting structure 4 comprises a plurality of secondary structures joined to the rigid structure 8. These secondary structures, which ensure the separating and supporting of supply systems whilst carrying aerodynamic cowling parts, are described below.

It is indicated that the turbojet engine 6 forwardly has a large-size fan case 18 delimiting an annular fan duct 20, and aftwardly comprises a smaller-sized central casing 22 enclosing the core of this turbojet engine. The casings 18 and 22 are evidently secured to each other and have a junction that is usually called the intermediate casing. Finally, it is specified that the central casing 22 is extended aftwardly via a so-called exhaust case (not referenced).

As can be clearly seen FIG. 1, the engine attachments 10, 12 of the structure 4 are designed to be two in number, and are respectively called the forward engine attachment and aft engine attachment. The forward engine attachment 10 is preferably positioned between a forward portion of the rigid structure 8 and an upper part of the fan case 18, also called the radial end part. This forward engine attachment 10 is of conventional design known to those skilled in the art and is designed for example to transmit the loads exerted in the three directions X, Y and Z.

The aft engine attachment 12, also of conventional design and known to those skilled in the art and possibly being designed to transmit the loads exerted in directions Y and Z, is inserted between a more aft portion of the rigid structure 8, and the central casing 22 or the exhaust case.

The thrust load device 14 transmitting loads generated by the engine may be of conventional design with two side thrust links each arranged on one side of the engine 6, the forward end of each thrust link being mounted on an aft part of the fan case or of the intermediate casing, and the aft end being joined to the aft engine attachment 12 or to the rigid structure 8 in the vicinity of this attachment.

In this preferred embodiment of the present invention, the rigid structure 8 is in the form of a box extending from forward to aft substantially in direction X.

The box 8, best illustrated FIG. 1, is then in the form of a pylon of similar design to that usually encountered for turbojet mounting pylons, particularly in that it is provided with transverse ribs 9 each assuming the form of a rectangle oriented along a plane YZ.

Referring more specifically to FIG. 2, the secondary structures of the pylon 4 include a forward aerodynamic structure 24, an aft aerodynamic structure 26, a fillet fairing 28 connecting the forward and aft aerodynamic structures, and a lower aft pylon fairing 30.

Globally, these secondary structures are conventional parts, identical or similar to those found in the prior art, and known to persons skilled in the art, with the exception of the forward aerodynamic structure 24 which will be described in more detail below.

More precisely, the forward aerodynamic structure 24, which is the only structure shown FIG. 1 for reasons of clarity, is usually positioned at the front part of the wing and is slightly raised relative to the primary structure 8 to which it is attached. It has an aerodynamic profile function between an upper part of the fan cowls hinged thereupon, and the leading edge of the wing. This forward aerodynamic structure 24 therefore not only acts as supporting structure for the fan cowls and aerodynamic cowling, but also allows the installation, separating and conveying of different supply systems (air, electric, hydraulic systems, fuel line).

In the direct aft continuation of this structure 24, and mounted above the rigid structure 8, is a fillet fairing 28 also called <<karman fairing>>. Next, still in the aft direction, the karman fairing 28 is extended by the aft aerodynamic structure 26, which contains most of the hydraulic equipment. This structure 26 is preferably positioned fully aftward relative to the rigid structure 8 and is therefore attached below the aircraft wing.

Finally, underneath the rigid structure 8 and the aft aerodynamic structure 26, there is the Lower Aft Pylon Fairing 30. Its essential functions are the formation of a fire protection shield and the formation of aerodynamic continuity between the engine exhaust and mounting pylon.

With specific reference to FIG. 1, part of the nacelle 3 can be seen having at its forward end an air intake 32 attached to the front part of the fan case 18, this air intake 32 being directly followed towards the rear by two fan cowls 34 (only one being visible since this is a perspective view) each hinge mounted on the secondary aerodynamic structure 24 described above. Although not illustrated, it is to be appreciated that the nacelle 3 of conventional design comprises other aft elements known to those skilled in the art, such as thrust reverser cowls mounted on the rigid structure 8.

Figure 3:
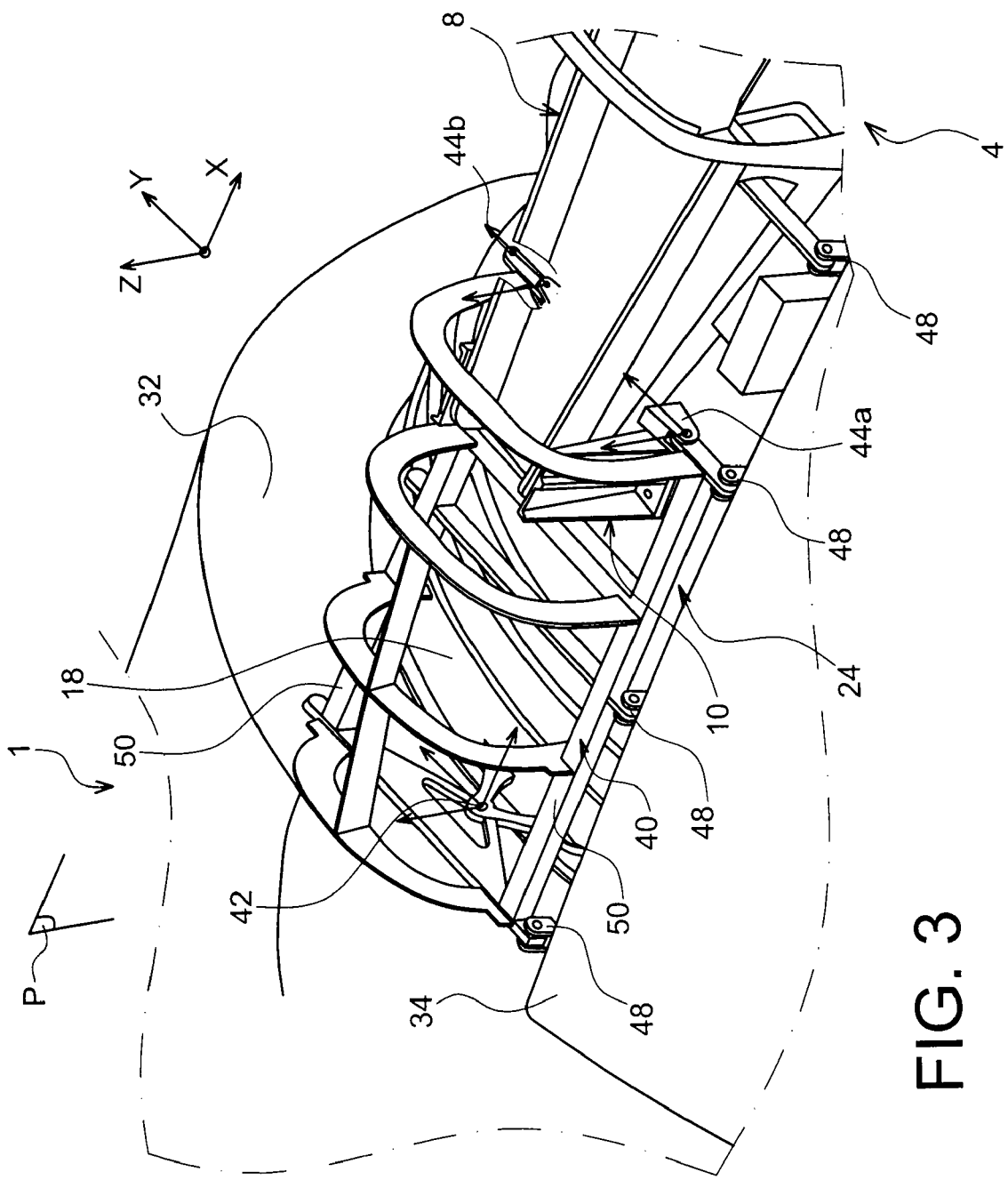
FIGS. 3 and 4 are partial, detailed perspective views from two different angles of the engine assembly shown FIG. 1.
Figure 4:
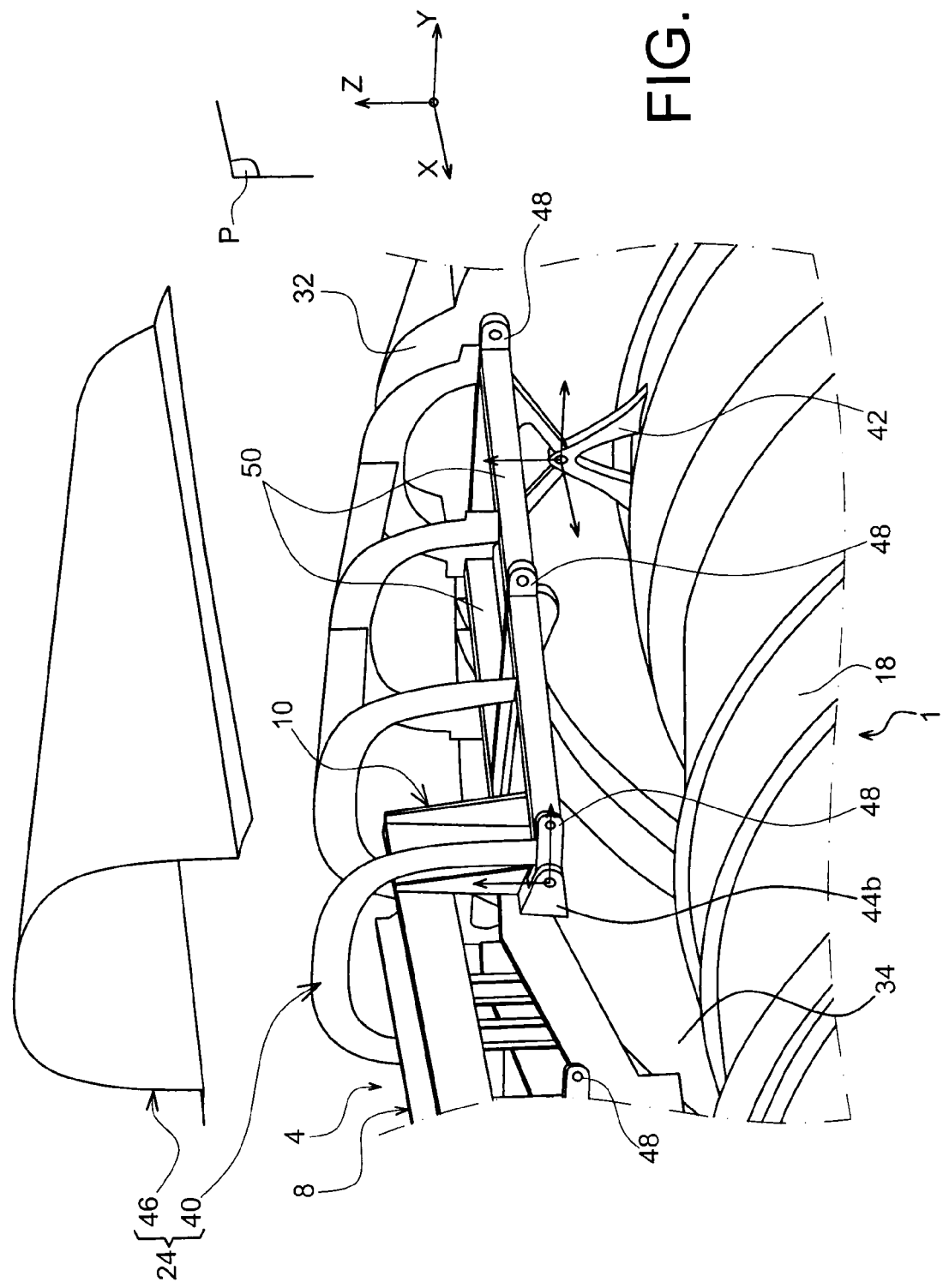

With reference now to FIGS. 3 and 4, detailing in particular the forward aerodynamic structure 24 which incorporates one of the particular aspects of the present invention.

The forward aerodynamic structure 24 has a cradle 40 forming the structural portion of this element. It globally extends above the fan case 18 and is of conventional design known to those skilled in the art, namely consisting of the assembly of spars substantially extending along direction X and of transverse downward-opening arches e.g. of substantially semi-cylindrical shape as can be clearly seen FIGS. 3 and 4. In these same figures, it can also be seen that the forward portion of the rigid structure 8 of the mounting pylon 4 enters inside this cradle passing at least under the first arch of this same cradle. Also, since the above-mentioned forward engine attachment 10 is mounted at a forward end of the rigid structure 8, this means that this forward engine attachment 10 is partly located within an inner space delimited by the arches of the cradle. In this respect, it is to be noted that in FIGS. 3 and 4, the lower part of attachment 10 intended to be joined to the fan case 18 is not shown for reasons of clarity.

To ensure assembly of the cradle 40 on the engine assembly 1, forward mounting means are provided as well as aft mounting means, as will be described below.

Regarding the forward mounting means, these are globally in the form of a forward attachment 42 joined to a forward end of the cradle 40. One of the particular aspects of the invention lies in the fact that this forward attachment 42 is not only secured to the cradle 40 but also to the fan case 18 of the engine. More precisely, it is mounted on an upper radial end of the fan case 18, and is preferably designed to transmit the loads exerted in each of directions X, Y and Z of the engine, as is diagrammatically shown by the arrows in FIGS. 3 and 4. By way of indication, this engine attachment can be conventionally designed with brackets and pins such as known to persons skilled in the art. In the example shown in the figures, the attachment is globally in the form of a bracket of upturned V-shape, with the apex of the V directed upwardly and defining a clevis through which a pin passes oriented in direction X of the engine, and ensuring the connection with another V-shaped bracket joined to the cradle 40, whose V apex faces downwardly therefore cooperating with the apex of the first above-mentioned V-bracket.

Also, the aft mounting means are preferably in the form of two aft semi-attachments arranged either side of a forward part of the rigid structure 8. As can be seen FIGS. 3 and 4, these two semi-attachments 44a, 44b are preferably positioned aftward relative to the forward engine attachment 10, so that this attachment therefore lies in direction X between the forward mounting means and the aft mounting means of the forward aerodynamic structure 24. Each of the two aft semi-attachments 44a, 44b is preferably designed to transmit the loads exerted in directions Y and Z, but not those exerted in direction X. Here again, they are of conventional design known to those skilled in the art, and using pins and brackets. By way of indication, it is noted that each semi-attachment may comprise a bracket extending in direction Y which, at its end opposite the end joined to the rigid structure 8, comprises a clevis through which a pin is passed also cooperating with a bracket housed in said clevis and joined to the cradle 40. Also, each of these two aft semi-attachments 44a, 44b is therefore designed so as to allow limited relative movement in direction X between the aft part of the aerodynamic structure 24 and the forward part of the rigid structure 8 of the pylon. It is indicated that if the forward mounting means are added to the most forward lying arch of the cradle 40, the two aft semi-attachments 44a, 44b are joined to the most aftward lying arch of the cradle 40 as can be clearly seen FIGS. 3 et 4. Also these two semi-attachments are arranged symmetrically via a medina vertical plane P passing through the longitudinal axis 5 of the engine, this plane P globally forming a plane of symmetry for the engine assembly intended to be attached under the aircraft wing.

The cradle 40, conventionally surrounded by aerodynamic cowling 46 that is preferably solely attached to this same cradle 40 and not onto any other part of the assembly, is provided with a plurality of hinge fittings for the fan cowls 34, these hinge fittings preferably being arranged at each of the two side spars of the cradle, arranged either side of plane P. Each of these two spars 50 therefore carries a plurality of hinge fittings 48 connected to one of the fan cowls 34 of the nacelle, these hinge fittings 48 carried by each spar 50 possibly forming all or part of the mounting means for a given fan cowl. In the example shown FIGS. 3 and 4, the hinge fittings 48 provided on a given spar 50, which may be three in number, are associated with a fourth hinge fitting 48 located in the aftward continuation of the three others, this fourth hinge fitting 48 being secured to the forward part of the rigid structure 8, to the rear of the aft mounting means of the aerodynamic structure 24. Evidently, for each of the two fan cowls 34, the hinge fittings 48 provided on the cradle and the hinge fitting(s) 48 positioned towards the rear on the rigid structure 8, are designed so as to be arranged along one same hinge axis of the cowl 34.

Evidently, various modifications can be made by persons skilled in the art to the invention just described as a non-limiting example. In this respect, it can be indicated in particular that while the engine assembly 1 has been presented in a configuration adapted for underwing attachment to the aircraft, this assembly 1 could also have a different configuration for mounting above the same wing, even onto an aft portion of the fuselage of this aircraft.

The invention claimed is:

1. An aircraft engine assembly comprising:
   an engine;
   an engine mounting structure; and
   a nacelle surrounding the engine and comprising fan cowls;
   the engine mounting structure comprising a rigid structure and a forward aerodynamic structure, the forward aerodynamic structure comprising a cradle on which the fan cowls are hinge mounted and is clad with aerodynamic cowling, and
   the cradle comprising aft mounting means mounted on the rigid structure of the mounting structure and forward mounting means mounted on a fan case of the engine, the forward mounting means located at a forward end portion of the cradle.

2. An engine assembly according to claim 1,
   wherein the forward mounting means are in a form of a forward attachment configured to transmit loads exerted in a longitudinal direction of the engine, in a transverse direction of the engine, and in a vertical direction of the engine.

3. An engine assembly according to claim 1,
   wherein the aft mounting means comprises two aft semi-attachments arranged on either side of a forward part of the rigid structure of the mounting structure, each of the two aft semi-attachments configured to transmit loads exerted in a transverse direction to the engine and in a vertical direction of the engine, and each allowing relative limited movement in a longitudinal direction of the engine between an aft part of the cradle of the forward aerodynamic structure and a forward part of the rigid structure.

4. An engine assembly according to claim 3, wherein the aft semi-attachments are arranged symmetrically relative to a median plane of the assembly, passing through a longitudinal axis of the engine.

5. An engine assembly according to claim 1, wherein the nacelle comprises an air intake lying flush with the fan cowls, and positioned forwardly relative to the cowls.

6. An engine assembly according to claim 1, wherein the aerodynamic cowling is fixedly mounted on the cradle carrying the forward and aft mounting means.

7. Engine assembly according to claim 1, wherein a forward part of the rigid structure of the mounting structure enters into an aft portion of the cradle.

8. An engine assembly according to claim 1, further comprising a plurality of fan cowl hinge fittings, at least some of the hinge fittings being fixed to the cradle.

9. An engine assembly according to claim 1, wherein the mounting structure further comprises a plurality of engine attachments amongst which a forward engine attachment is attached firstly to the rigid structure and secondly to the fan case of the engine.

10. An engine assembly according to claim 9, wherein the forward engine attachment is positioned, in a longitudinal direction of the engine, between the forward and aft mounting means of the cradle of the forward aerodynamic structure.

11. An aircraft comprising at least one engine assembly according to claim 1, assembled on a wing or an aft part of a fuselage of the aircraft.

\* \* \* \* \*